United States Patent [19]

Kunikane et al.

[11] Patent Number: 5,546,212
[45] Date of Patent: Aug. 13, 1996

[54] OPTICAL MODULE FOR TWO-WAY TRANSMISSION

[75] Inventors: Tatsuro Kunikane; Akira Okamoto; Tetsuo Watanabe; Sadayuki Miyata, all of Kawasaki; Hiroyuki Furukawa; Yoshimitsu Sakai, both of Sapporo, all of Japan

[73] Assignee: Fujitsu Limited, Kawasaki, Japan

[21] Appl. No.: 323,716

[22] Filed: Oct. 18, 1994

[30] Foreign Application Priority Data

Nov. 18, 1993 [JP] Japan .................... 5-289300
Jul. 29, 1994 [JP] Japan .................... 6-178862

[51] Int. Cl.⁶ .................. G02B 6/42; G02B 6/34
[52] U.S. Cl. .................. 359/163; 385/36; 385/47; 385/33; 385/93
[58] Field of Search .................. 359/163; 385/36, 385/15, 33, 35, 47, 92, 93

[56] References Cited

U.S. PATENT DOCUMENTS

| | | | |
|---|---|---|---|
| 5,005,935 | 4/1991 | Kunikane et al. | 350/96.16 |
| 5,129,022 | 7/1992 | Marcus | 385/47 |
| 5,146,516 | 9/1992 | Blümke et al. | 385/36 |
| 5,274,723 | 12/1993 | Komatsu | 385/36 |
| 5,388,171 | 2/1995 | Michikoshi et al. | 385/36 |
| 5,404,414 | 4/1995 | Avelange et al. | 385/36 |

FOREIGN PATENT DOCUMENTS

| | | |
|---|---|---|
| 0464869A1 | 1/1992 | European Pat. Off. |
| 0542011 | 5/1993 | European Pat. Off. |
| 0559551A1 | 9/1993 | European Pat. Off. |
| 4-286376 | 10/1992 | Japan |

OTHER PUBLICATIONS

"Optical Transceiver", Miller, *Technical Digest –Western Electric*, No. 64, Oct. 1981, p. 39.

*Primary Examiner*—Leo Boudreau
*Assistant Examiner*—Bhavesh Mehta
*Attorney, Agent, or Firm*—Nikaido, Marmelstein, Murray & Oram LLP

[57] ABSTRACT

An optical module for two-way transmission includes a lens for converging a received light from an optical fiber, and a photodiode for sensing the converged received light. A laser diode outputs a transmitted light, and a prism shifts the optical path of the transmitted light converged by the lens, and inputs the transmitted light to the optical fiber.

18 Claims, 10 Drawing Sheets

OPTICAL MODULE FOR TWO-WAY TRANSMISSION

BACKGROUND OF THE INVENTION

1. Field of the invention

The present invention relates to an optical module for two-way transmission.

2. Description of the Related Art

In recent years, research and development of application of an optical transmission system to subscribers systems has been pursued on an implementation level. For example, it is proposed that a two-way optical transmission system through the use of the same wavelength or wavelength multiplex be applied to subscribers systems. The proposed system is such that carries on two-way optical transmission through a single optical fiber linking the station and each subscriber's terminal, and the establishment of technology to mass-produce the optical module for two-way transmission functioning for transmission and reception in the subscribers' terminal devices is one of the key technologies in implementing the system.

The commonest structure to achieve transmitting and receiving functions in a subscriber's device in the subscribers system to which two-way optical transmission can be applied includes an LD module structured so as to converge a light emitted from a laser diode chip into the excitation end of a first optical fiber, a PD module structured so as to converge a light emitted from the excitation end of a second optical fiber into a photodiode chip, and an optical coupler for coupling the first and the second optical fibers to a third optical fiber as the optical transmission path. Since the above mentioned structure is disadvantageous in terms of downsizing and cost reduction, there are proposed optical modules for two-way transmission in which the functions of transmission and reception can be achieved by a single part.

An example of the optical modules for two-way transmission of the related art includes an LD collimator formed by integrating a laser diode chip and a lens, a PD collimator formed by integrating a photodiode chip and a lens, a fiber collimator formed by integrating an end of an optical fiber and a lens, and an optical coupler structured by forming a filter film on a glass substrate. The LD collimator, PD collimator, fiber collimator, and the optical coupler are for example fixed on the substrate in predetermined relative positions. A transmitted light output from the LD collimator is for example reflected by the filter film and input to the fiber collimator, while a received light output from the fiber collimator is for example allowed to pass through the filter film and a glass block and input to the PD collimator.

Another example of the optical modules for two-way transmission of the related art includes a Y-branch type optical waveguide having a first to a third port. The first to third ports respectively have an optical fiber, a laser diode chip, and a photodiode chip, optically connected thereto. A transmitted light from the laser diode is supplied to the optical fiber through the Y-branch and a received light from the optical fiber is supplied to the photodiode through the Y-branch.

With the former related art example of the optical modules for two-way transmission, there was a problem that the downsizing was difficult because the collimators had to be fabricated as separate parts. With the latter related art example of the optical modules for two-way transmission, there was a problem that skill was required in such work as the coupling of the optical fiber with the optical waveguide and, hence, fabrication of it was not easy.

SUMMARY OF THE INVENTION

Accordingly, an object of the present invention is to provide an optical module for two-way transmission suitable for downsizing and easy for fabrication.

According to the present invention, there is provided an optical module for two-way transmission to be connected to the end of an optical fiber, which comprises a lens for converging a received light output from the excitation end of the optical fiber, optical/electrical conversion means for converting the converged received light into a received signal, and electrical/optical conversion means for converting a transmitting signal input thereto into a transmitted light, in which the electrical/optical conversion means is disposed in the vicinity of the optical/electrical conversion means, and the transmitted light from the electrical/optical conversion means is converged by the lens, and which further comprises optical path shifting means for shifting the optical path of the converged transmitted light so as to be input to the excitation end of the optical fiber.

In the optical module for two-way transmission of the invention, the electrical/optical conversion means and the optical/electrical conversion means disposed close to each other are optically coupled with the excitation end of the optical fiber through the one lens and the optical path shifting means and, hence, downsizing of the module is facilitated and productivity thereof is improved.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

An embodiment of the present invention will be described below in detail with reference to the accompanying drawings.

Figure 1:
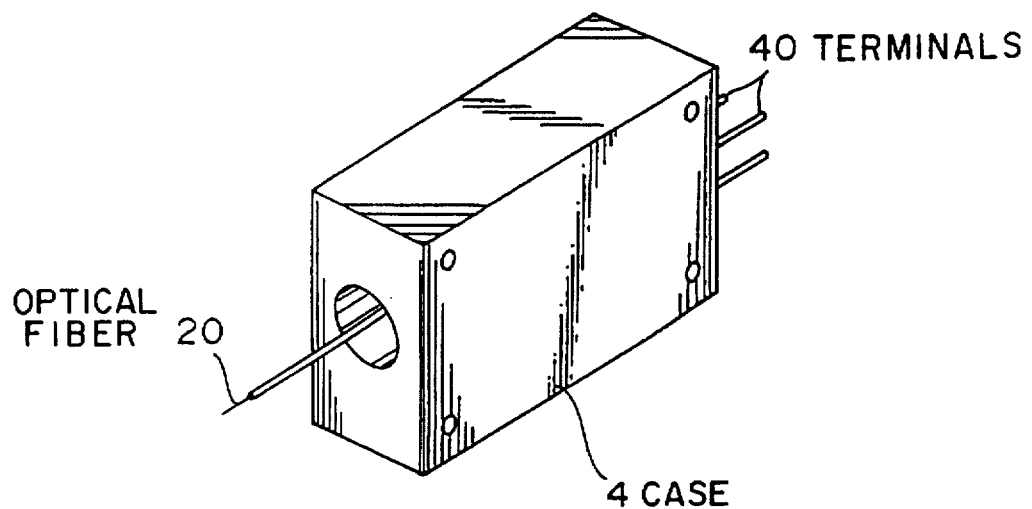
FIG. 1 is a perspective view of an optical module for two-way transmission indicating an embodiment of the invention.
Figure 2:
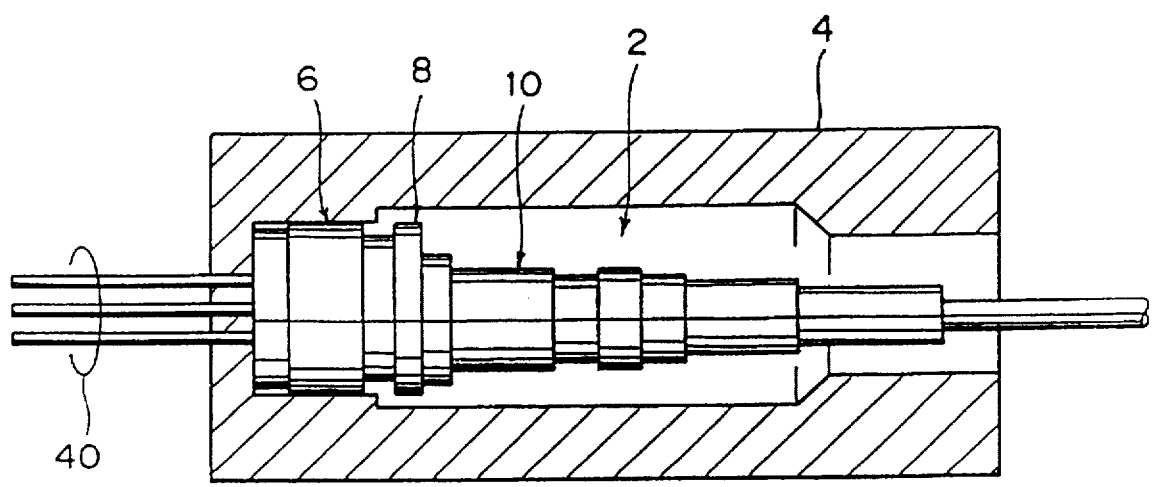
FIG. 2 is a sectional view of the module shown in FIG. 1.
Figure 3:
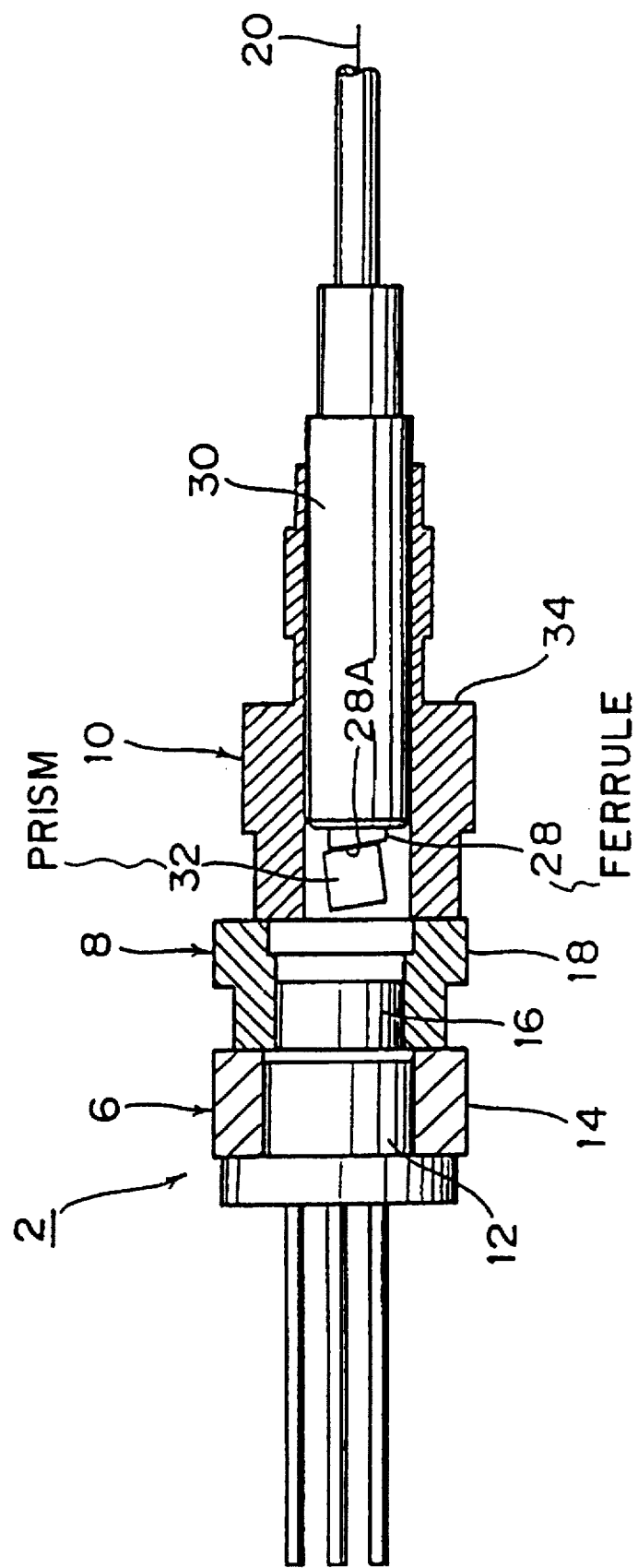
FIG. 3 is a sectional view of the body of the module shown in FIG. 2.

FIG. 1 is a perspective view of an optical module for two-way transmission with the present invention applied thereto, FIG. 2 is a sectional view of the module of FIG. 1, and FIG. 3 is a sectional view of the body of the module shown in FIG. 2. The optical module for two-way transmission is, as well shown in FIG. 1 and FIG. 2, structured by a module body 2 housed in a mold case 4 formed of a resin and the like and, hence, the module is improved in its mountability on a printed wiring board and the like.

The module body 2 is, as well shown in FIG. 3, structured by integrating an optical device assembly 6, a lens assembly 8, and a fiber assembly 10. The optical device assembly 6 is structured by having a package 12 containing chips of a laser diode and the like, described later, held by a metallic holder 14. The lens assembly 8 is structured by having a lens 16 placed and fixed in a metallic holder 18. While the lens 16 in the embodiment is constituted of an aspherical lens, it may be constituted of a spherical lens or a gradient-index rod lens. The fiber assembly 10 is formed of a ferrule 28 in which an optical fiber 20 is placed and fixed, a sleeve 30 in which the ferrule 28 is placed and fixed, a prism 32 fixed on the end face of the ferrule 28, and a metallic holder 34 for holding the sleeve 30. The end face 28A of the ferrule 28 on the side of the lens 16 is slanted from the plane perpendicular to the axis of the optical fiber 20. The metallic holders 14, 18, and 34 each have flat end faces virtually perpendicular to the axis of the optical fiber 20 and are fixedly joined with the end faces abutting on each other. In fixing them, laser welding, for example, is used and, thereby, alignment of their optical axes prior to the fixing is facilitated.

Figure 4:
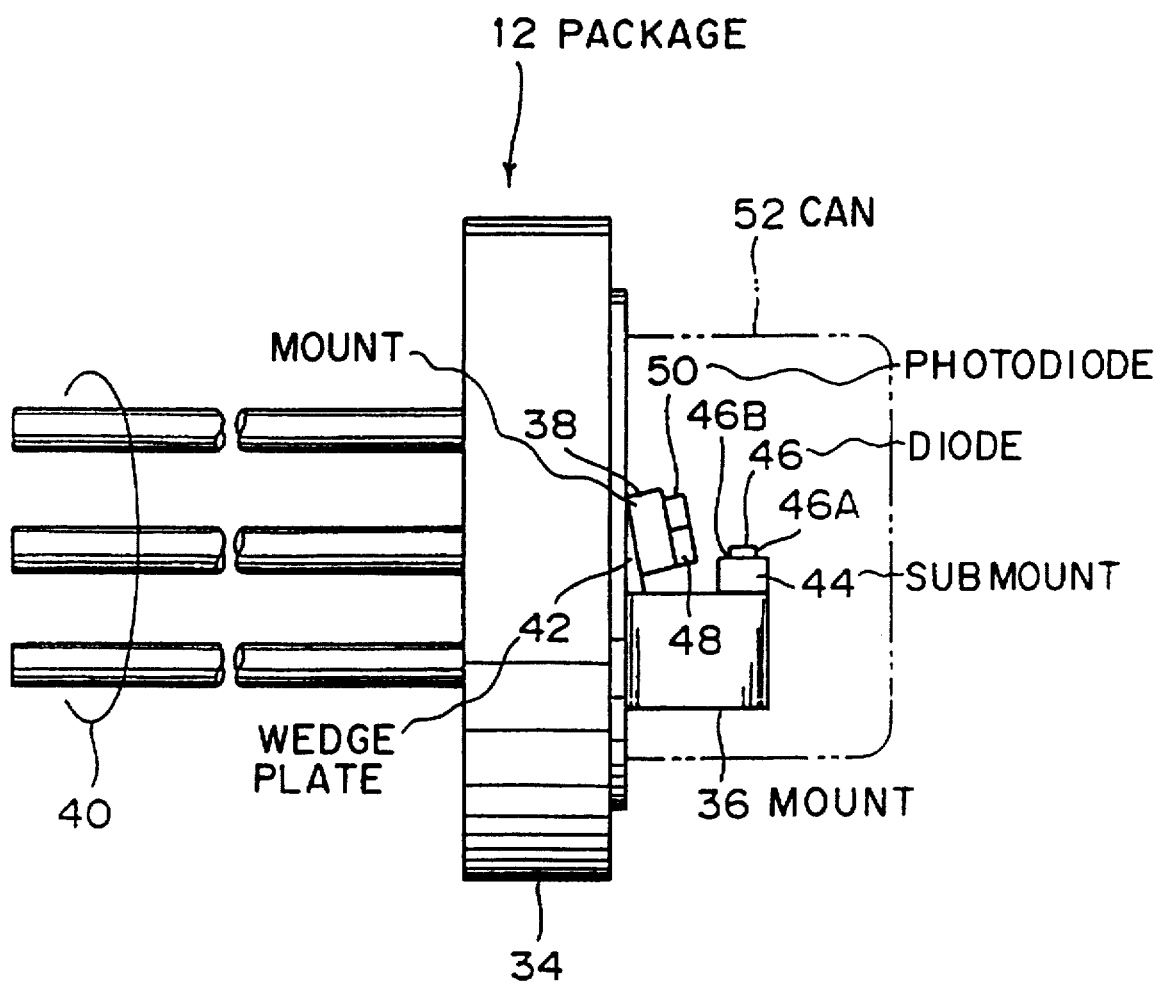
FIG. 4 is a side view of a package shown in FIG. 3.

FIG. 4 is a side view of the package 12 shown in FIG. 3. The package 12 is such that is equivalent to an LD package used in the CD (compact disk) reproducing apparatus and has a base 34 virtually of a disk form. On one side of the base 34, there are provided mounts 36 and 38 and, on the other side of the base 34, there are provided a plurality of terminals 40 projecting from the base. The mount 38 is obliquely fixed to the base 34 with a wedge plate 42 interposed therebetween. At the end of the top of the mount 36, there is fixed a submount 44. The submount 44 has a laser diode 46 mounted there on. The laser diode 46 has excitation ends 46A and 46B formed of semiconductor cleavage planes on both its ends. A transmitted light is output from the excitation end 46A and a monitor light is output from the excitation end 46B.

On the mount 38, there is fixed a photodiode 48 opposite to the excitation end 46B of the laser diode 46. The photodiode 48 receives the monitor light and outputs a monitor signal corresponding to the intensity of the received monitor light. On the mount 38, there is also provided a photodiode 50 disposed close to the photodiode 48. The photodiode 50 receives the received light and outputs a received signal. The mount 38 is obliquely fixed to the base 34 in order to prevent the monitor light, which has reflected from the photosensing surface of the photodiode 48, from returning to the excitation end 46B of the laser diode 46 thereby causing the laser diode 46 to oscillate in an unwanted mode.

Figure 5A:
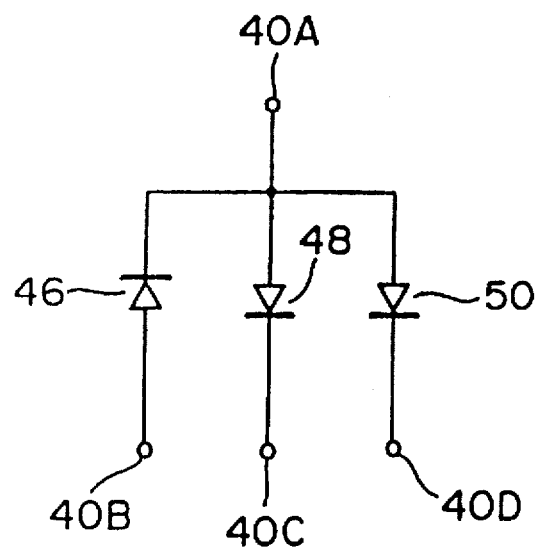
FIGS. 5A and 5B show diagrams indicating examples of connections of optical devices in the package.
Figure 5B:
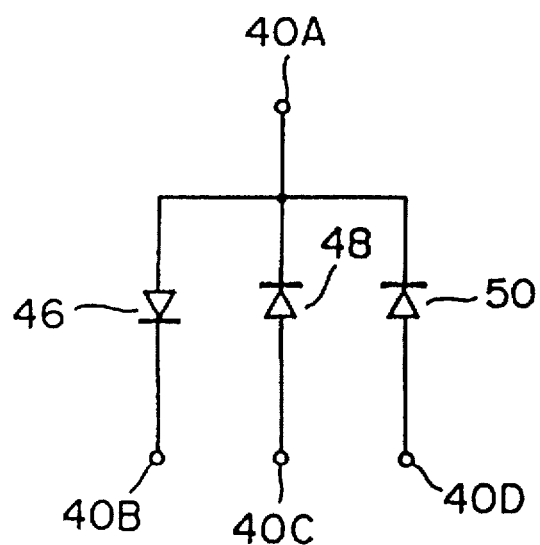

FIGS. 5A and 5B show diagrams indicating examples of connections of the optical devices with the terminals 40 in the package 12. In these examples, the terminals 40 are made up of a common terminal 40A and three independent terminals 40B, 40C, and 40D. In the example of FIG. 5A, the cathode of the laser diode 46, the anode of the photodiode 48, and the anode of the photodiode 50 are connected to the common terminal 40A, while the anode of the laser diode 46, the cathode of the photodiode 48, and the cathode of the photodiode 50 are connected to the independent terminals 40B, 40C, and 40D, respectively. In the example of FIG. 5B, the anode of the laser diode 46, the cathode of the photodiode 48, and the cathode of the photodiode 50 are connected to the common terminal 40A, while the cathode of the laser diode 46, the anode of the photodiode 48, and the anode of the photodiode 50 are connected to the independent terminals 40B, 40C, and 40D, respectively. In these examples, the reason why the laser diode and photodiodes are reversely connected is that the laser diode is used with a forward current passed therethrough, while the photodiode is used with a reverse bias applied thereto.

According to the examples of connections shown in FIGS. 5A and 5B, since the optical devices are connected to the common terminal 40A, it is made possible to use an economical drive circuit with a single power supply and also to lower the fabrication cost of the package. Reference numeral 52 in FIG. 4 denotes a can for hermetically sealing up the optical devices therein and this can 52 has a window for allowing the transmitted light and the received light to pass therethrough formed in a position opposite to the laser diode 46 and the photodiode 50.

Figure 6:
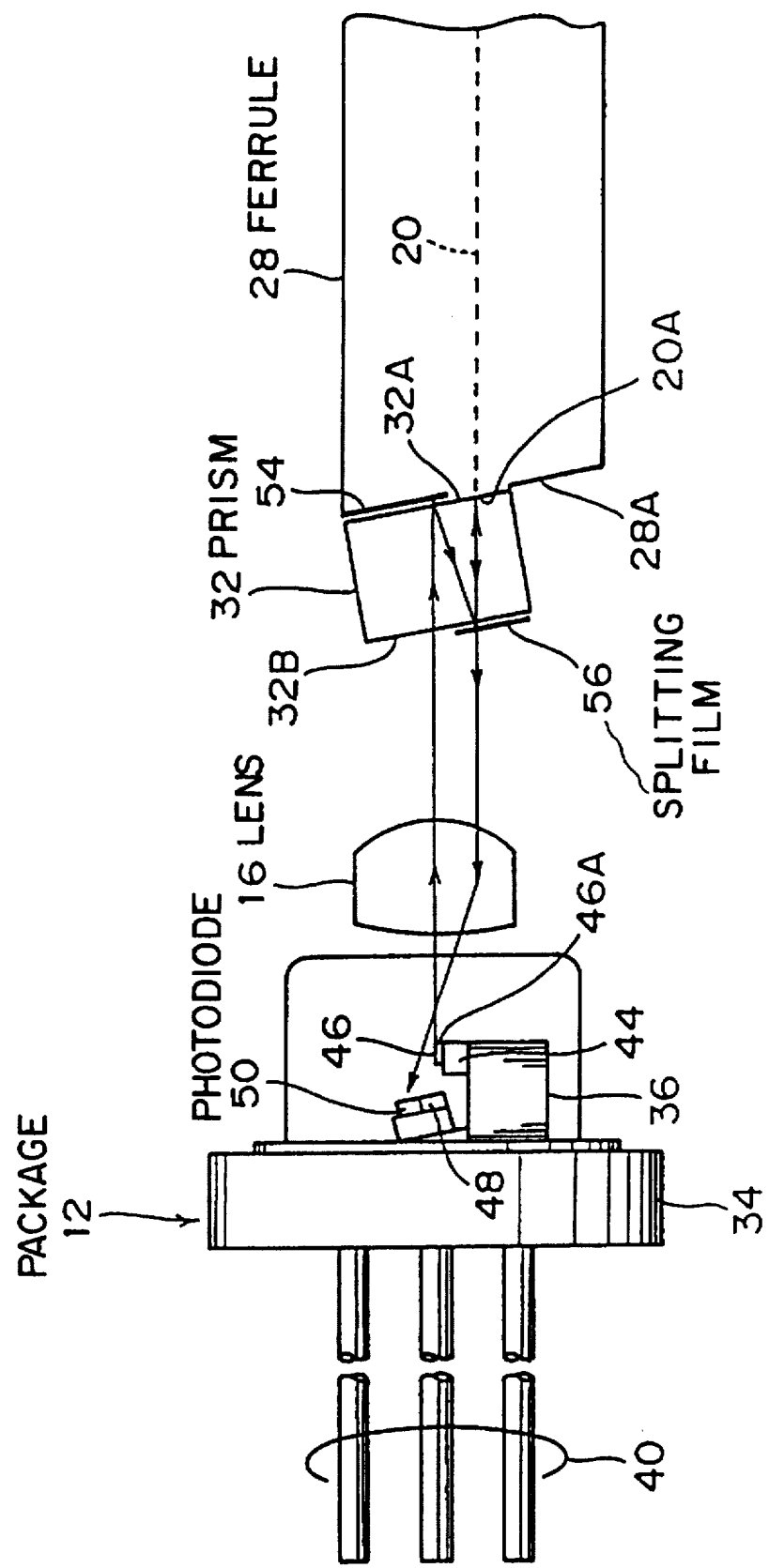
FIG. 6 is a diagram explanatory of the operation of the optical module for two-way transmission of the embodiment.

FIG. 6 is a diagram explanatory of the operation of the optical module for two-way transmission according to the embodiment. In this embodiment, in order that one optical fiber 20 is optically coupled to the laser diode 46 and the photodiode 50 using one lens 16, a prism 32 is used as an optical path shifting means. The prism 32 has a first surface 32A and a second surface 32B for allowing the received light and the transmitted light to pass therethrough. The received light passes through the first surface 32A and the second surface 32B in order of mention, while the transmitted light passes through the second surface 32B, reflects from the first surface 32A and the second surface 32B in order of mention, and passes through the first surface 32A. Especially in this embodiment, in order to simplify the fabrication of the prism 32 and facilitate the establishment of conditions therefor to be described later, the first surface 32A and the second surface 32B of the prism 32 are formed to be parallel to each other. In this case, the prism 32, in order to have the above described function, has the first surface 32A partly provided with a total reflection film 54 formed thereon and the second surface 32B partly provided with a splitting film 56 formed thereon. The total reflection film 54 is formed for example of a metallic film or a dielectric multilayer film and the splitting film 56 is formed for example of a dielectric multilayer film.

When the transmitted light and the received light have the same wavelength, a portion of the transmitted light is reflected by the splitting film 56 and also a portion of the received light is allowed to pass through the splitting film 56. In order to minimize the loss in the splitting film 56, an optical filter film whose transmittance and reflectivity depend on the wavelength of the incident light can also be used as the splitting film 56. In this case, the transmitted light and the received light have different wavelengths from each other and most of the transmitted light reflects from the splitting film 56 and most of the received light passes through the splitting film 56.

The received light output from the excitation end 20A of the optical fiber 20 is allowed to pass through the prism 32 and output from its second surface 32B through the splitting film 56. The received light is then converged by the lens 16 into the photosensing surface of the photodiode 50. On the other hand, the transmitted light emitted from the excitation end 46A of the laser diode 46 is converged by the lens 16 into the excitation end 20A of the optical fiber 20 through the prism 32. Namely, the transmitted light enters the prism 32 through the portion of the second surface 32B of the prism 32 at which the splitting film 56 is not formed, reflects from the total reflection film 54 and the splitting film 56 in order of mention, and enters the excitation end 20A of the optical fiber 20 stuck to the second surface 32A.

In this embodiment, since the first surface 32A and the second surface 32B of the prism 32 are parallel to each other, in order to produce an axial difference between the optical paths of the transmitted light and the received light, the end face 28A of the ferrule 28 is slanted from the plane perpendicular to the axis of the optical fiber 20 and the first surface 32A of the prism 32 is fixedly attached to the ferrule end face 28A with for example an optical adhesive.

Figure 7A:
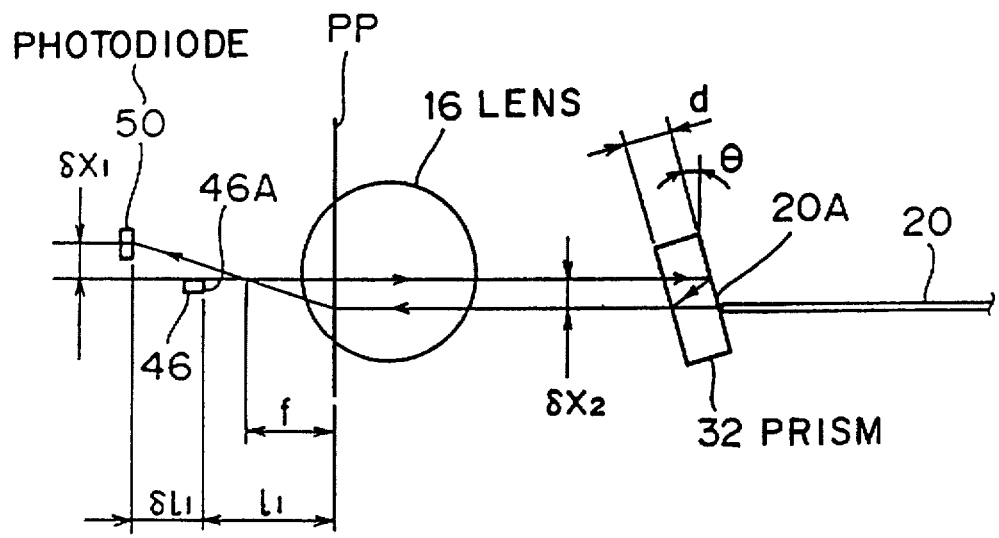
FIGS. 7A and 7B show diagrams explanatory of the principle of an axial difference produced between the optical paths of a transmitted light and a received light.
Figure 7B:
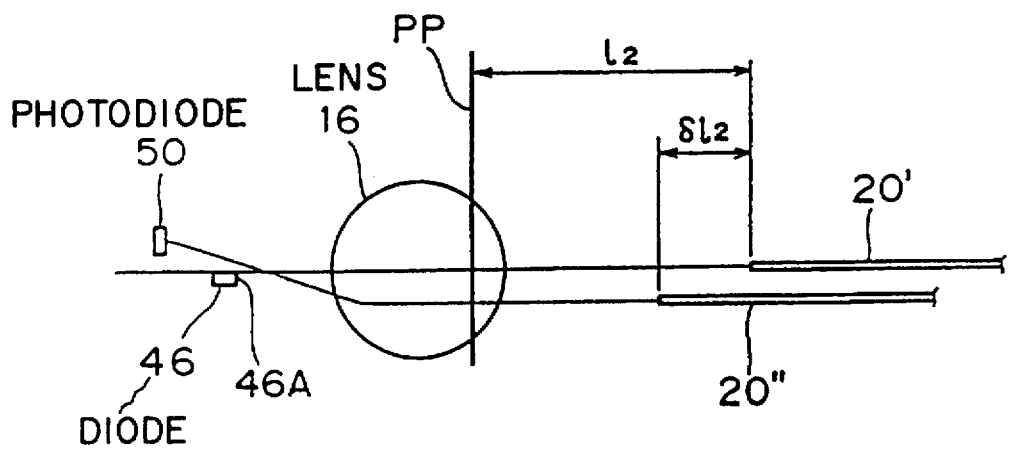

The principle of occurrence of the axial difference between the optical paths of the transmitted light and the received light will be described below with reference to FIGS. 7A and 7B. FIG. 7A is a diagram showing the optical paths of the transmitted light and the received light when there exists a prism 32 and FIG. 7B is a diagram showing virtual positions of the optical fiber 20 when the optical paths in the prism 32 are replaced by optical paths in air. Reference numeral 20' denotes the virtual position of the optical fiber 20 for the transmitted light and reference numeral 20" denotes the virtual position of the optical fiber 20 for the received light.

Now, we denote the thickness, index of refraction, and angle of slant of the prism by d, n, and θ, respectively, the focal distance of the lens 16 by f, the optical length between the excitation end 46A of the laser diode and the principal plane PP of the lens 16 by $l_1$, the optical length between the photosensing surface of the photodiode 50 and the principal plane PP of the lens 16 by $l_1+\delta l_1$, the optical lengths between the principal plane PP of the lens 16 and the excitation end 20A of the optical fiber 20 for the transmitted light and the received light by $l_2$ and $l_2-\delta l_2$, respectively, the difference between the optical paths of the photodiode 50 and the laser diode 46 by $\delta x_1$, and the difference between the optical paths of the transmitted light and the received light between the lens 16 and the excitation end 20A of the optical fiber 20 by $\delta x_2$.

The optical coupling efficiency between the laser diode 46 and the optical fiber 20 and that between the photodiode 50 and the optical fiber 20 can be improved by suitably setting $\delta x_2$ and $\delta l_2$ according to the relative positions of the laser diode 46 and the photodiode 50 (of which parameters are $\delta x_1$ and $\delta l_1$). In concrete terms, the above optical coupling efficiencies can be improved by having the conditions given by the following expressions (1) to (5) satisfied. The parameters facilitating the adjustments to satisfy these conditions are the thickness d, the index of refraction n, and the angle of slant θ of the prism 32.

$$1/l_1+1/l_2=1/(l_1+\delta l_1)+1/(l_2-\delta l_2)=1/f \quad (1)$$

$$\delta x_2=\delta x_1 f/(l_1+\delta l_1-f) \quad (2)$$

$$\delta x_2=2d\ tan\theta\ cos\theta_1 \quad (3)$$

$$\delta l_2=2d\ sec\theta/n-\delta x_2\ tan\theta_1 \quad (4)$$

$$sin\theta_1=n\ sin\theta \quad (5)$$

In the embodiment, while the prism 32 is adhesively attached to the ferrule 28 (refer to FIG. 6) in order to achieve downsizing of the module, the prism 32 may be disposed between the ferrule 28 and the lens 16 supported by a dedicated supporting member. In this case, by structuring the ferrule 28 with the optical fiber 20 placed and fixed therein so as to be detachable from the rest of the device, a module of a receptacle type can be obtained. Instead of the single lens, an array lens having a pitch corresponding to the above described parameter $\delta x_1$ may be used.

When such a package as shown in FIG. 4 is used, there is a degree of freedom in determining the fixed position of the photodiode 50 to receive the received light. Variations of the fixed position will be described below with reference to FIGS. 8A, 8B and 8C.

Figure 8A:
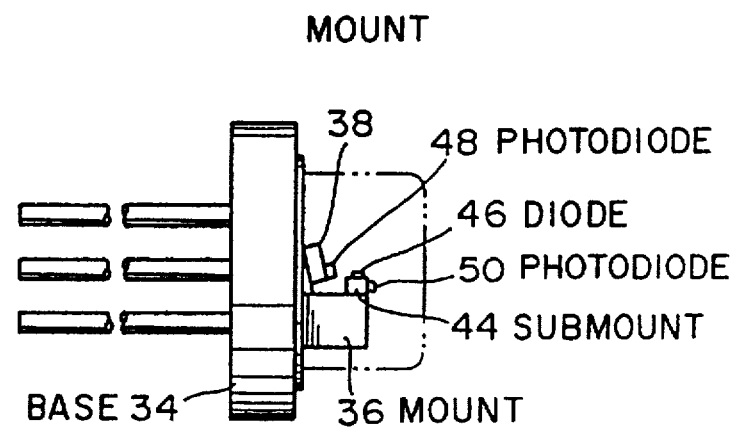
FIGS. 8A, 8B and 8C show diagrams indicating examples of fixed positions of the photodiode for reception.
Figure 8B:
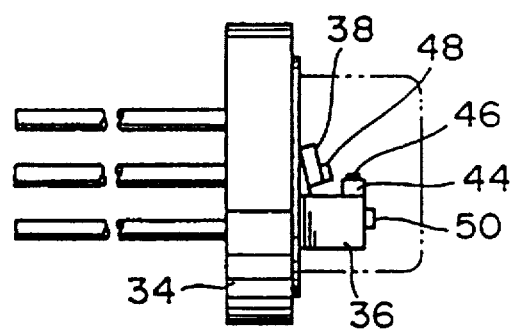
Figure 8C:
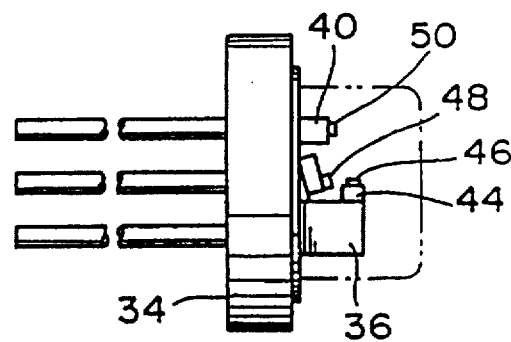

In the example shown in FIG. 8A, the photodiode 50 for receiving the received light is fixed on the end face of the submount 44 on the side of the lens 16 (refer to FIG. 6). In the example shown in FIG. 8B, the photodiode 50 is fixed on the end face of the mount 36 on the side of the lens 16. In the example shown in FIG. 8C, the photodiode 50 is fixed on the end face of the terminal 40 extended toward the lens 16. Thus, by disposing the photodiode 50 for reception and the laser diode 46 for transmission close to each other through the use of members contained in the package 12 and by disposing the prism 32 with a suitable thickness at a suitable angle of slant (refer to FIG. 6), it is made possible to optically couple the photodiode 50 and the laser diode 46 to the single optical fiber 20. When the photodiode 50 is fixed on the end face of the terminal 40 as shown in FIG. 8C, one of the wirings for the photodiode 50 can be eliminated.

When the module of the embodiment is fabricated using parts with the parameters satisfying the conditions given by expressions (1) to (5) set therein, alignment of the optical axis prior to fixing of the metallic holders 14, 18, and 34 to each other can be achieved only by positional adjustments of the metallic holders by sliding their end surfaces along each other. In concrete terms, having the optical coupling efficiency between the photodiode 50 and the optical fiber 20 kept within a tolerance, the optical coupling efficiency between the laser diode 46 and the optical fiber 20 is actually measured, and by performing positional adjustments of the metallic holders so that the measured value is maximized, satisfactory relative positions of the metallic holders can be set. Here, while the tolerance for the axial difference of the laser diode 46 is below several µm, the tolerance for the axial difference of the photodiode 50 is above dozens of µm, and therefore, the alignment of the optical axis can be achieved easily.

An embodiment suitable for use in optical ping-pong transmission will be described. In the optical ping-pong transmission, signal sending and receiving are performed alternately. Therefore, when a photodiode for signal reception and a photodiode for monitoring are disposed close to each other, it is desired that the monitoring does not affect the signal reception. Structure in concrete terms will be description below.

Figure 9:
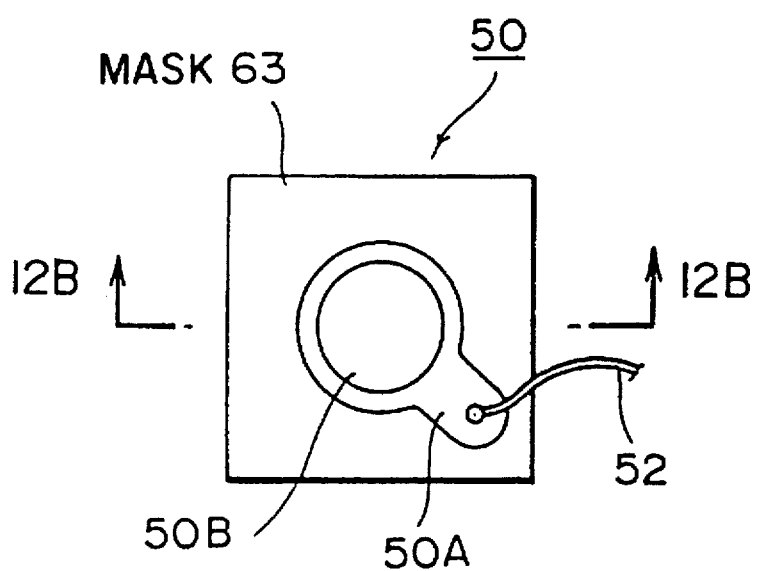
FIG. 9 is a plan view of a monitoring photodiode.

FIG. 9 is a plan view of the photodiode 50 for reception shown in FIG. 4. The photodiode 50 has on its surface a ring-shaped electrode 50A and a photosensing surface 50B defined by the electrode 50A. Reference numeral 52 denotes a bonding wire for connecting the electrode 50A with an external circuit.

Figure 10:
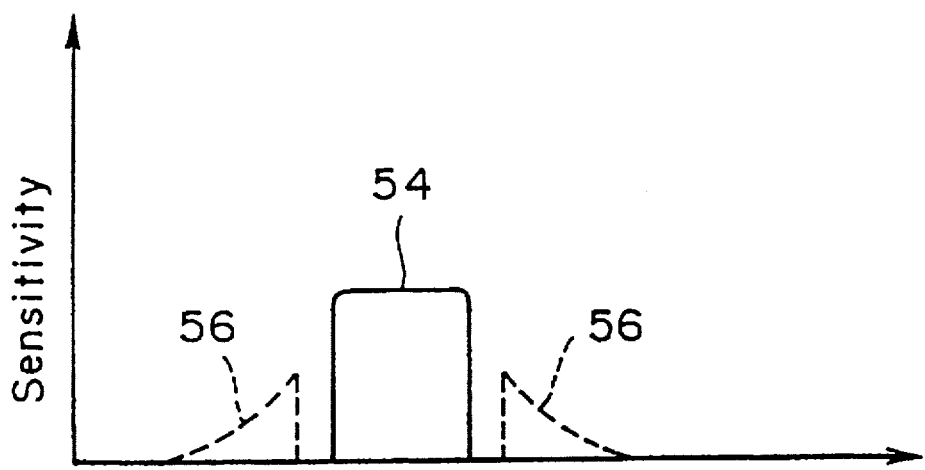
FIG. 10 is a diagram showing sensitivity distribution along line A—A in FIG. 9.

FIG. 10 is a diagram showing photosensitivity distribution of the photodiode 50 along line A—A in FIG. 9 including the diameter of the photosensing surface 50B. The axis of ordinates represents the sensitivity and the axis of abscissas represents the position along line A—A.

The curve in solid line indicated by numeral 54 is a tolerance curve of the sensitivity on the photosensing surface 50B, from which it is known that a virtually constant sensitivity is obtained all over the photosensing surface 50B. The photodiode 50 also has photosensitive regions outside the electrode 50A as indicated by the broken line 56. The response speed in the photosensitive region indicated by numeral 56 is slower than the response speed in the photosensing surface 50B. Noises are produced in ping-pong transmission due to the difference in the response speed.

Figure 11:
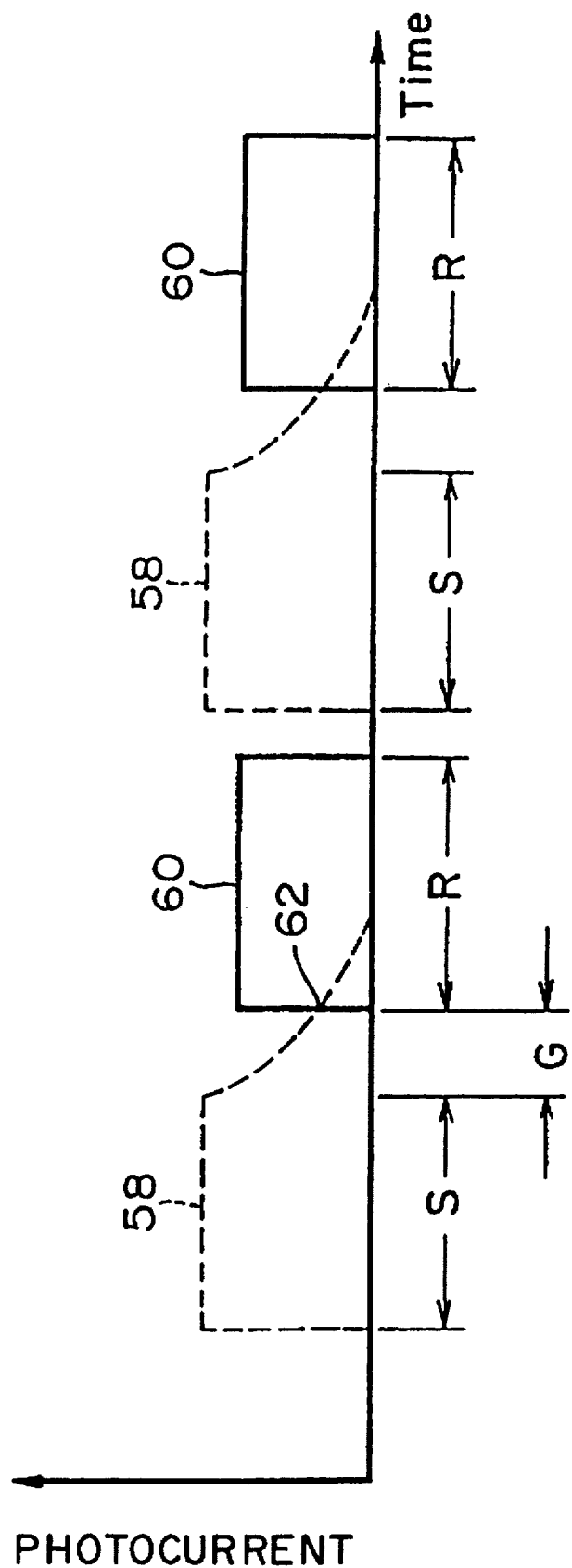
FIG. 11 is a diagram explanatory of noise production in ping-pong transmission.

FIG. 11 is a diagram explanatory of noise production in the ping-pong transmission. The axis of ordinates represents the photocurrent generated in the photodiode 50 and the axis of abscissas represents the time. Along the time axis, "S" corresponds to signal sending and "R" corresponds to signal receiving, while "G" corresponds to the guard time provided for temporal separation between the transmit signal and the receive signal.

In the structure shown in FIG. 4, for example, there is disposed a monitoring photodiode 48 opposite to the excitation end 46B of the laser diode 46 so that the monitor light emitted from the excitation end 46B is received by the photodiode 48. The monitor light also enters the photodiode 50 for signal reception and, hence, a crosstalk is produced.

The broken line indicated by numeral 58 in FIG. 11 represents the photocurrent generated in the photodiode 50 due to the crosstalk of the monitor light and the solid line indicated by numeral 60 represents the photocurrent generated in the photodiode 50 by the received light.

The crosstalk of the monitor light to the photodiode 50 is produced not only in the photosensing surface 50B of the photodiode 50 but also at the portion outside the electrode 50A. Since the response speed at the outside portion is slower than that in the photosensing surface 50B, the photocurrent due to the monitor light exhibits a dull trailing edge. Accordingly, as indicated by numeral 62 in FIG. 11, a noise is superposed on the receive signal. As a result, it becomes necessary to extend the guard time G in order to obtain a desired receiving sensitivity and, thereby, the transmission speed is deteriorated.

Therefore, there is provided in the present embodiment a mask 63 covering the surface of the photodiode 50 on the periphery of the electrode 50A as shown in FIG. 9. Thereby, the response speed of the photodiode to the crosstalk of the monitor light is improved and the trailing edge of the photocurrent generated in the photodiode 50 due to the crosstalk of the monitor light is sharpened, so that the noise is prevented from being superposed on the receive signal even when the guard time G is small.

Figure 12A:
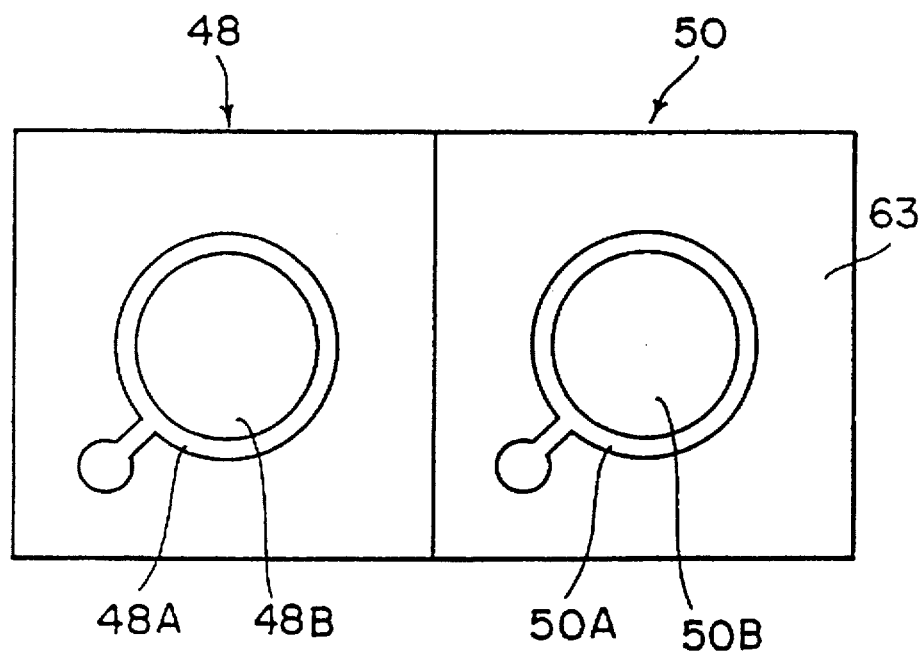
FIG. 12A and FIG. 12B are a plan view and a sectional view, respectively, of a photodiode array.
Figure 12B:
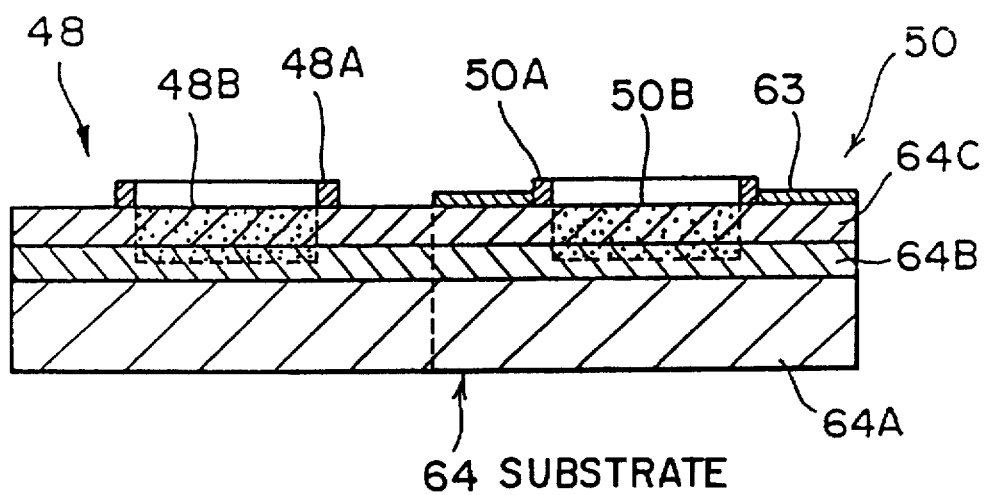

As the photodiode 50 for signal reception and the photodiode 48 for monitoring, a photodiode array can be employed. FIG. 12A is a plan view of the photodiode array and FIG. 12B is a sectional view of the same.

The photodiodes 48 and 50 are integrally formed on a semiconductor substrate 64. While the photodiode 50 has a ring-shaped electrode 50A and a photosensing surface 50B defined by the electrode 50A, the photodiode 48 likewise has a ring-shaped electrode 48A and a photosensing surface 48B defined by the electrode 48A.

The semiconductor substrate 64 is formed of an n-InP layer 64A, an n-InGaAs layer 64B, and an n-InP layer 64C with one laminated to another in order of mention. The photosensing surfaces are formed by diffusing P (phosphor) to a predetermined depth in the area inside the electrode 48A and 50A.

Also in this embodiment, there is provided a mask 63 covering the surface of the photodiode 50 on the periphery of the electrode 50A to prevent noises from being produced in ping-pong transmission. The mask 63 may be of any material provided that it can shield the monitor lightwave and it will be formed on the semiconductor substrate by an ordinary method. In order to make the photodiode array versatile, a mask may be formed also on the monitoring photodiode 48.

According to the invention, as described in the foregoing, such an effect is obtained that an optical module for two-way transmission of which downsizing is easy and fabrication is simple can be provided.

While the present invention has been described with reference to particular embodiments, the invention is not limited to the details of these embodiments. Preferred embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. An optical module for two-way transmission to be connected to an optical fiber having an excitation end said optical module comprising:

a lens for converging a received light output from said excitation end;

optical/electrical conversion means for converting said converged received light into a reception signal;

electrical/optical conversion means for converting a transmitting signal input thereto into a transmitted light, said electrical/optical conversion means being disposed in the vicinity of said optical/electrical conversion means, said transmitted light from said electrical/optical conversion means being converged by said lens; and optical path shifting means for shifting the optical path of said converged transmitted light so as to be input to the excitation end, said optical path shifting means including a prism having a first surface and a second surface through which said received light and said transmitted light pass, wherein said received light passes through said first surface and said second surface in order of mention, said transmitted light passes through said second surface, reflects from said first surface and said second surface in order of mention, and passes through said first surface, and wherein said first surface and said second surface are substantially parallel to each other.

2. An optical module for two-way transmission according to claim 1, wherein said optical path shifting means further includes a total reflection film formed on said first surface for reflecting said transmitted light, and a splitting film formed on said second surface for reflecting said transmitted light and allowing said received light to pass therethrough.

3. An optical module for two-way transmission according to claim 2, wherein said transmitted light and said received light have the same wavelength, a portion of said transmitted light is reflected by said splitting film, and a portion of said received light is allowed to pass through said splitting film.

4. An optical module for two-way transmission according to claim 2, wherein said splitting film comprises an optical filter film whose transmittance and reflectivity depend on the wavelength of an incident lightwave, said transmitted light and said received light have different wavelengths from each other, most of said transmitted light is reflected by said optical filter film, and most of said received light is allowed to pass through said optical filter film.

5. An optical module for two-way transmission according to claim 1, further comprising a ferrule in which the end portion of said optical fiber is placed and fixed and of which the end face is positioned on the same plane as said excitation end, wherein the first surface of said prism is adhesively attached to the end face of said ferrule.

6. An optical module for two-way transmission according to claim 5, wherein the end face of said ferrule is slanted from a plane perpendicular to the axis of said optical fiber.

7. An optical module for two-way transmission according to claim 1, wherein said optical/electrical conversion means comprises a first photodiode having a photosensing surface, and said electrical/optical conversion means comprises a laser diode having a first excitation end for outputting said transmitted light.

8. An optical module for two-way transmission according to claim 7, wherein said laser diode further has a second excitation end for outputting a monitor light, said optical module for two-way transmission further comprising a second photodiode receiving said monitor light for outputting a monitor signal corresponding to the intensity of said monitor light.

9. An optical module for two-way transmission according to claim 8, further comprising a package, in which said first and second photodiodes and said laser diode are contained, wherein said package includes a base, a first and a second mount fixed on said base, a submount fixed on said first mount, and a plurality of terminals projecting from said base, said laser diode and said second photodiode are fixed on said submount and said second mount, respectively, said received signal and said monitor signal are output from two of said plurality of terminals, and said transmitting signal is input to another one of said plurality of terminals.

10. An optical module for two-way transmission according to claim 9, wherein said first photodiode is fixed on said second mount.

11. An optical module for two-way transmission according to claim 9, wherein said first photodiode is fixed on said submount.

12. An optical module for two-way transmission according to claim 9, wherein said first photodiode is fixed on said first mount.

13. An optical module for two-way transmission according to claim 9, wherein said first photodiode is fixed to the end of one of said plurality of terminals.

14. An optical module for two-way transmission according to claim 9, wherein said plurality of terminals include a common terminal and first to third independent terminals, said common terminal is connected with the anode of said laser diode, the cathode of said first photodiode, and the cathode of said second photodiode, and said first to third independent terminals are connected with the cathode of said laser diode, the anode of said first photodiode, and the anode of said second photodiode, respectively.

15. An optical module for two-way transmission according to claim 9, wherein said plurality of terminals include a common terminal and first to third independent terminals, said common terminal is connected with the cathode of said laser diode, the anode of said first photodiode, and the anode of said second photodiode, and said first to third independent terminals are connected with the anode of said laser diode, the cathode of said first photodiode, and the cathode of said second photodiode, respectively.

16. An optical module for two-way transmission according to claim 8, wherein said first photodiode further has a ring-shaped electrode defining said photosensing surface and a mask covering surface of said first photodiode on the periphery of said electrode.

17. An optical module for two-way transmission according to claim 8, wherein said first and second photodiodes are integrally formed on a common semiconductor substrate.

18. An optical module for two-way transmission according to claim 7, wherein said optical path shifting means includes a total reflection film formed on said first surface for reflecting said transmitted light, and a splitting film formed on said second surface for reflecting said transmitted light and allowing said received light to pass therethrough, said first surface and said second surface are slanted from a plane perpendicular to the axis of said optical fiber, and said optical path shifting means substantially satisfies the conditions Given by the following expressions:

$$1/l_1 + 1/l_2 = 1/(l_1 + \delta l_1) + 1/(l_2 - \delta l_2) = 1/f$$

$$\delta x_2 = \delta x_1 f/(l_1 + \delta l_1 - f)$$

$$\delta x_2 = 2d \tan\theta \cos\theta_1$$

$$\delta l_2 = 2d \sec\theta/n - \delta x_2 \tan\theta_1$$

$$\sin\theta_1 = n \sin\theta$$

where d, n, and θ are the thickness, index of refraction, and angle of slant of said prism, respectively, f is the focal distance of said lens, $l_1$ is the optical length between the first excitation end of said laser diode and the principal plane of said lens, $l_1 + \delta l_1$ is the optical length between the photosensing surface of said first photodiode and the principal plane of said lens, $l_2$ is the optical length between the principal plane of said lens and the excitation end of said optical fiber for said transmitted light, $l_2 - \delta l_2$ is the optical length between the principal plane of said lens and the excitation end of said optical fiber for said received light, $\delta x_1$ is the difference between the optical paths of said first photodiode and said laser diode, and $\delta x_2$ is the difference between the optical paths of the transmitted light and the received light between said lens and the excitation end of said optical fiber.

* * * * *